US009377917B2

(12) United States Patent
Lee

(10) Patent No.: US 9,377,917 B2
(45) Date of Patent: Jun. 28, 2016

(54) MOBILE TERMINAL AND METHOD FOR CONTROLLING THE SAME

(71) Applicant: LG ELECTRONICS INC., Seoul (KR)

(72) Inventor: Kiho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/500,302

(22) Filed: Sep. 29, 2014

(65) Prior Publication Data

US 2015/0370365 A1    Dec. 24, 2015

(30) Foreign Application Priority Data

Jun. 18, 2014    (KR) .................. 10-2014-0074605

(51) Int. Cl.
  *G06F 3/045* (2006.01)
  *G06F 3/044* (2006.01)
  *G06F 3/01* (2006.01)

(52) U.S. Cl.
  CPC ............. *G06F 3/044* (2013.01); *G06F 3/013* (2013.01)

(58) Field of Classification Search
  None
  See application file for complete search history.

(56) References Cited

U.S. PATENT DOCUMENTS

| | | | |
|---|---|---|---|
| 2009/0201246 A1* | 8/2009 | Lee ................. | G06F 1/1626 345/156 |
| 2011/0059775 A1 | 3/2011 | Choi et al. | |
| 2013/0181924 A1* | 7/2013 | Hong ............... | G06F 3/0412 345/173 |
| 2015/0026647 A1* | 1/2015 | Park ................ | G06F 3/04842 715/863 |

FOREIGN PATENT DOCUMENTS

| | | |
|---|---|---|
| EP | 2 138 929 A2 | 12/2009 |
| EP | 2 624 116 A1 | 8/2013 |
| WO | WO 03/088013 A2 | 10/2003 |
| WO | WO 2012/012293 A2 | 1/2012 |

* cited by examiner

*Primary Examiner* — Nicholas Lee
(74) *Attorney, Agent, or Firm* — Birch, Stewart, Kolasch & Birch, LLP

(57) ABSTRACT

A mobile terminal and a method for controlling the same are disclosed. The mobile terminal displays, on a display unit, a touch input interface including at least one graphic object and a first region defined to correspond each graphic object, recognizes the defined first region as a touch input region of the each graphic object, changes the touch input region of the each graphic object to a specific region discriminated from the defined first region upon sensing approach of the mobile terminal within a predetermined distance from a first object through the sensing unit, and recognizes the changed specific region as the touch input region for receiving touch input from a second object while a distance between the mobile terminal and the first object keeps within the predetermined distance.

19 Claims, 20 Drawing Sheets

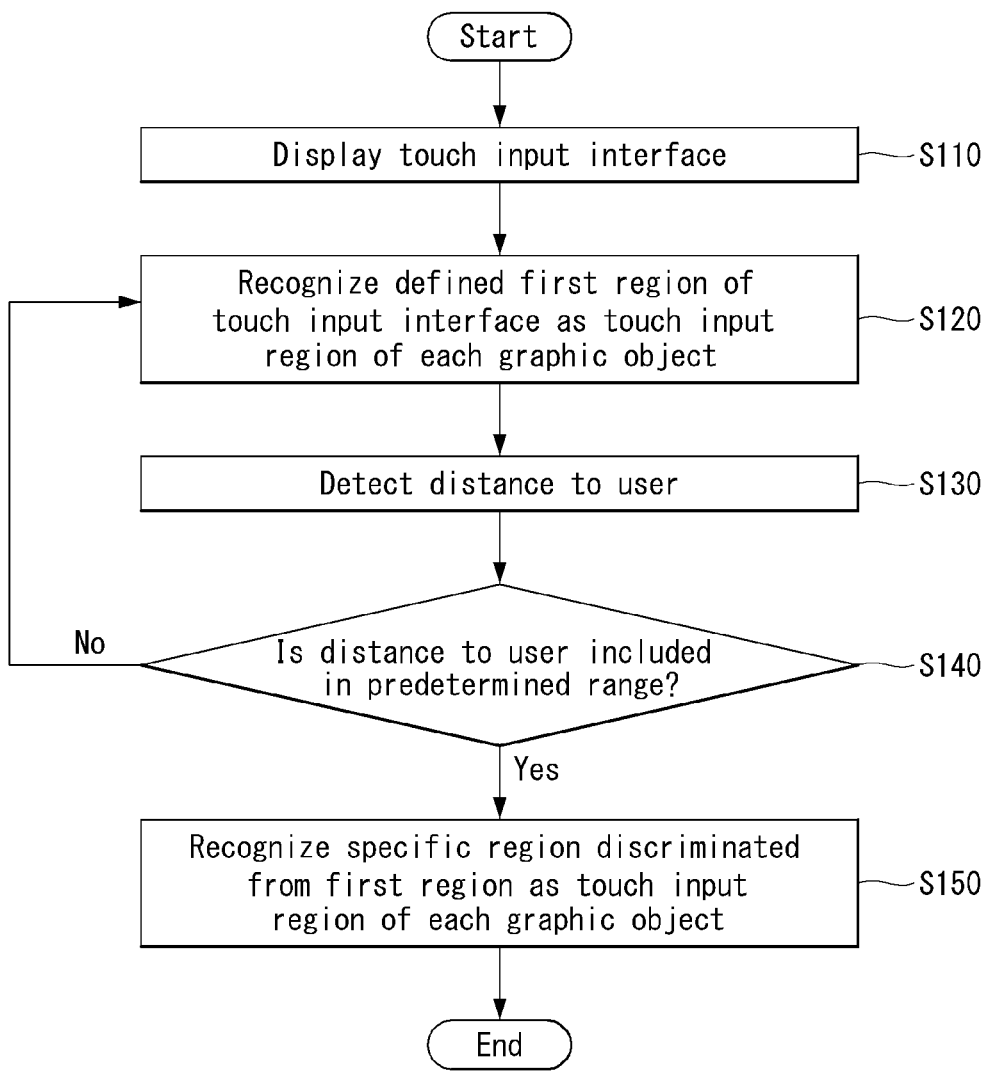

FIG. 7
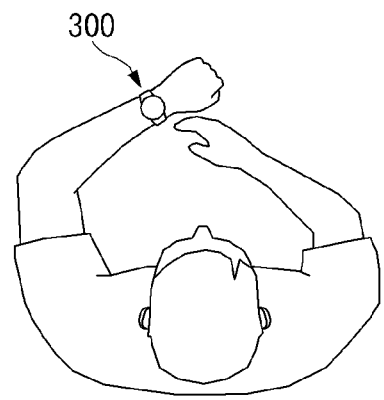
(a)
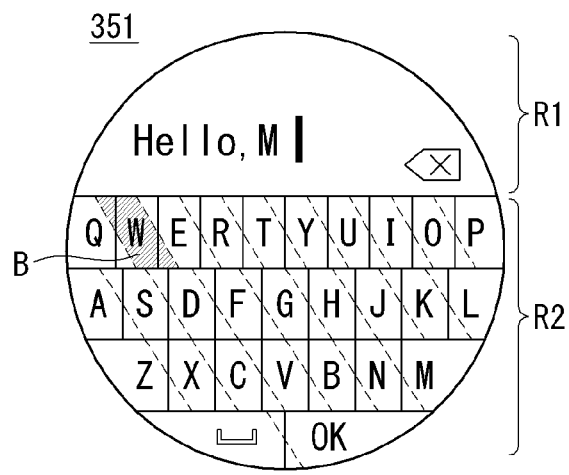
(b)
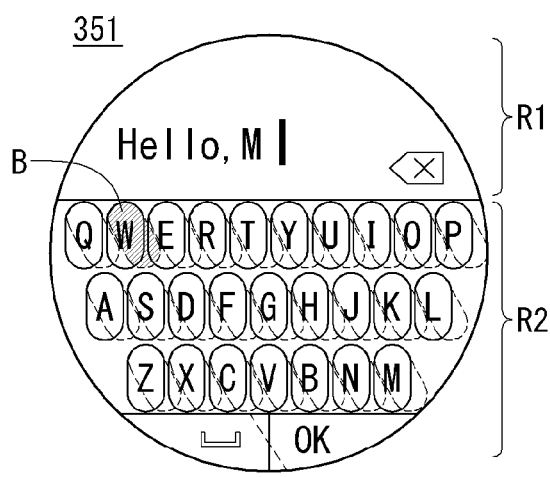
(c)

FIG. 8
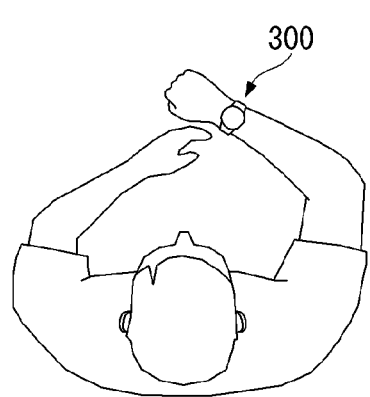
(a)
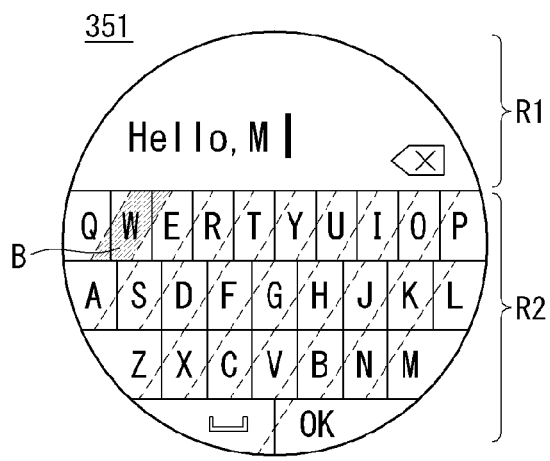
(b)
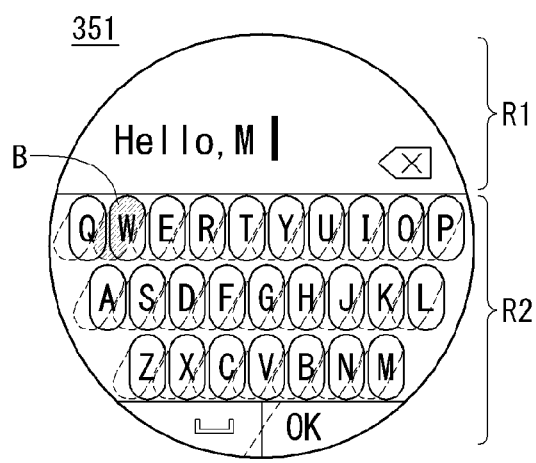
(c)

(a)  (b)

FIG. 12
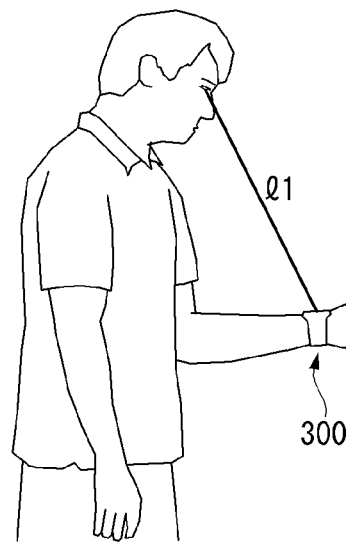
(a)
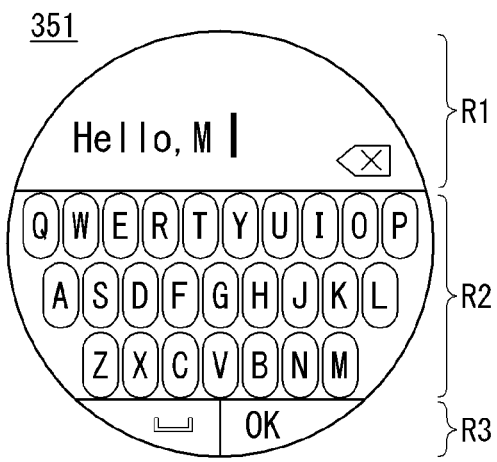
(b)
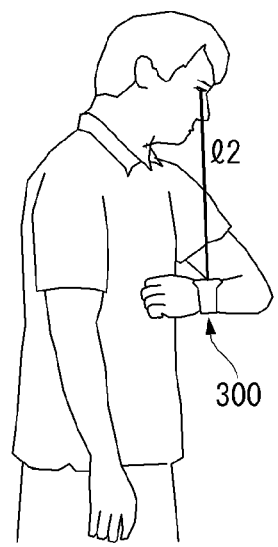
(c)
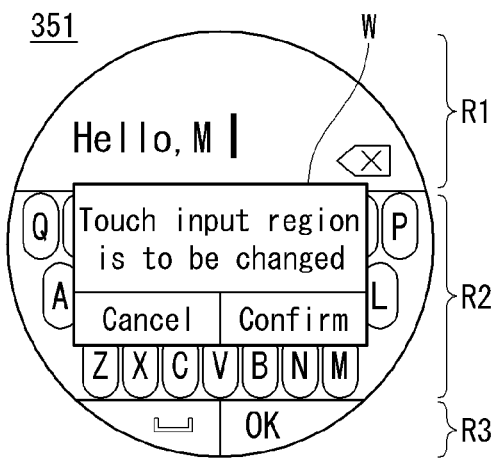
(d)

(a)            (b)

MOBILE TERMINAL AND METHOD FOR CONTROLLING THE SAME

CROSS-REFERENCE TO RELATED APPLICATIONS

This application claims priority to Korean Patent Application No. 10-2014-0074605 filed on 18 Jun., 2014 in Korea, the entire contents of which is hereby incorporated by reference in its entirety.

TECHNICAL FIELD

The present invention relates to a mobile terminal which automatically corrects a touch input range and a method for controlling the same.

DISCUSSION OF THE RELATED ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

The latest terminals provide multimedia services using information sensed from a plurality of sensors included therein to execute complex functions.

Particularly, researches on methods for improving a touch recognition rate according to use state of a wearable terminal are attempted.

SUMMARY OF THE DISCLOSURE

Accordingly, an object of the present invention is to address the above-noted and other problems.

To accomplish the object of the present invention, there is provided a mobile terminal and a method for controlling the same, including: displaying, on a display unit, a touch input interface including at least one graphic object and a first region defined to correspond each graphic object; recognizing the defined first region as a touch input region of each graphic object; changing the touch input region of each graphic object to a specific region discriminated from the defined first region when approach of the mobile terminal within a predetermined distance from a first object is sensed through a sensing unit; and recognizing the changed specific region as a touch input region for receiving touch input from a second object.

To accomplish the object of the present invention, there is also provided a mobile terminal, including: a sensing unit; a display unit; and a controller configured to display, on the display unit, a touch input interface including at least one graphic object and a first region defined to correspond each graphic object, to recognize the defined first region as a touch input region of each graphic object and, to change the touch input region of each graphic object to a specific region discriminated from the defined first region upon sensing approach of the mobile terminal within a predetermined distance from a first object through the sensing unit and to recognize the changed specific region as a touch input region for receiving touch input from a second object while a distance between the mobile terminal and the first object keeps within the predetermined distance.

To accomplish the object of the present invention, there is also provided a method for controlling a mobile terminal, including: displaying, on a display unit, a touch input interface including at least one graphic object and a first region defined to correspond each graphic object; recognizing the defined first region as a touch input region of each graphic object; changing the touch input region of each graphic object to a specific region discriminated from the defined first region upon sensing approach of the mobile terminal within a predetermined distance from a first object; and recognizing the changed specific region as a touch input region for receiving touch input from a second object while a distance between the mobile terminal and the first object keeps within the predetermined distance.

The mobile terminal and method for controlling the same according to the present invention have the following advantages.

According to at least one of embodiments of the present invention, it is possible to improve touch input accuracy in response to use state by correcting a touch input region according to a direction in which a user wears a watch type mobile terminal and a distance to the user.

According to at least one of embodiments of the present invention, when a touch input region of a touch input interface is corrected, the corrected touch input region can be displayed to improve user convenience.

According to at least one of embodiments of the present invention, it is possible to manually select correction of the touch input region.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 3 is a flowchart illustrating a method for controlling a mobile terminal according to an embodiment of the present invention; and FIGS. 4 to 19 are views for explaining examples of the method for controlling the mobile terminal according to the present invention.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
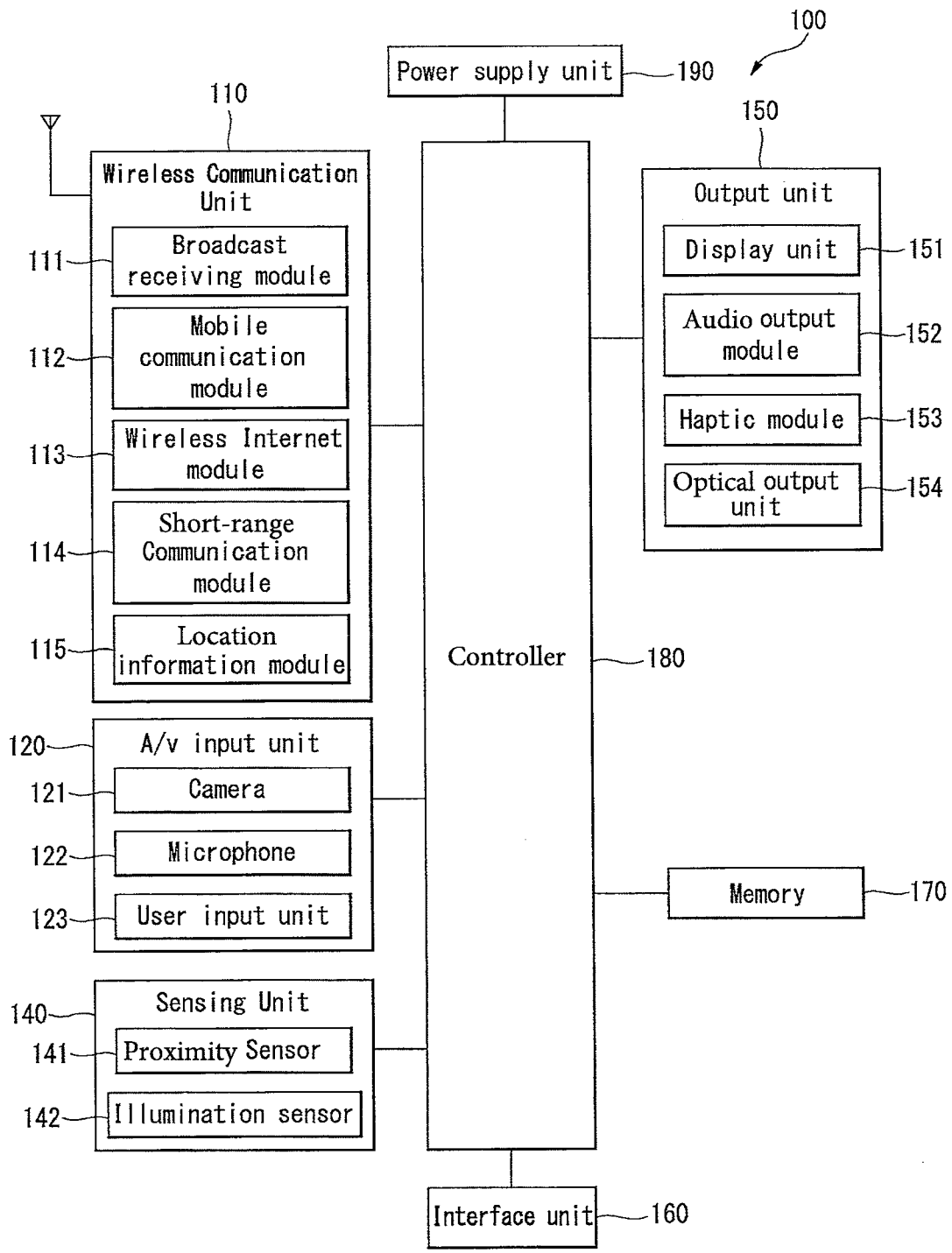
FIG. 1 is a block diagram of a mobile terminal in accordance with the present disclosure.

Reference is now made to FIG. 1 which is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Various embodiments described herein may be implemented in a computer-readable medium, a machine-readable medium, or similar medium using, for example, software, hardware, or any combination thereof.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2A:
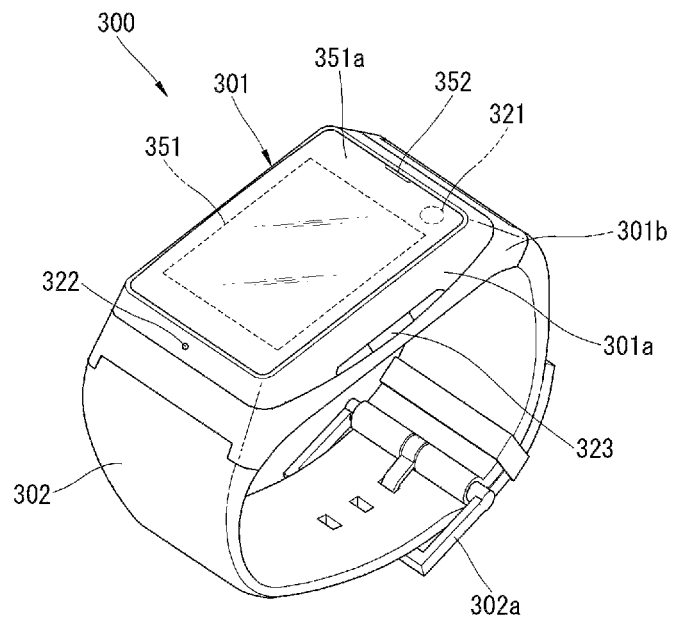
FIG. 2A and FIG. 2B is a conceptual view of a wearable mobile terminal according to another alternative embodiment of the present disclosure.
Figure 2B:
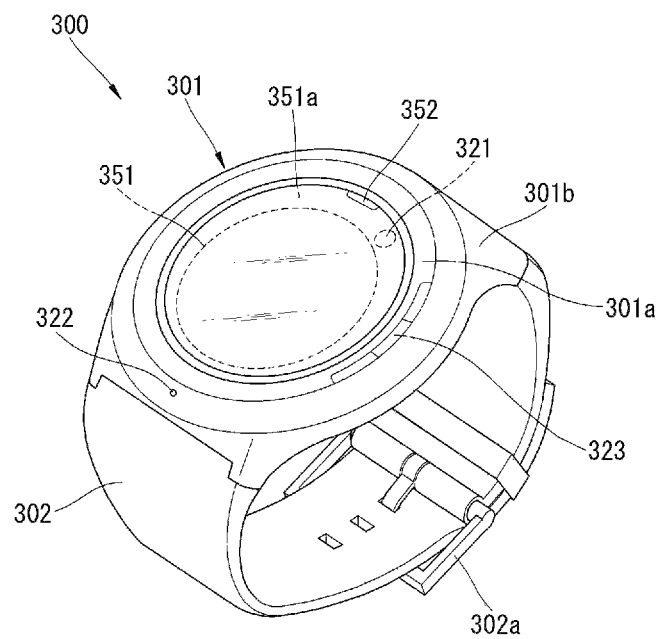

FIG. 2A and FIG. 2B are a perspective view illustrating one example of a watch-type mobile terminal 300 in accordance with another exemplary embodiment. As illustrated in FIG. 2A and FIG. 2B, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIG. 1.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Further preferred embodiments will be described in more detail with reference to additional drawing figures. It is understood by those skilled in the art that the present features can be embodied in several forms without departing from the characteristics thereof.

FIG. 3 is a flowchart illustrating a method for controlling a mobile terminal according to an embodiment of the present invention and FIGS. 4 to 19 are views for explaining examples of the method for controlling a mobile terminal according to an embodiment of the present invention.

Referring to FIG. 3, the controller of the mobile terminal may display, on the display unit (351 of FIG. 1), a touch input interface including at least one graphic object and a first region defined to correspond to each graphic object (S110). Here, the mobile terminal may include a smart watch or wearable healthcare equipment. The present invention will be described on the assumption that the mobile terminal is a smart watch.

The touch input interface can be configured in the form of at least one of a qwerty keyboard, drawing panel menu, remote control keys and dial keys, and the at least one graphic object can represent at least one of a numeral, a character, a symbol and a figure. For example, the at least one graphic object represents a numeral, a character or a symbol indicated on a function key of a qwerty keyboard when the touch input interface corresponds to the qwerty keyboard and represents a numeral, a character, a symbol or a figure indicated on a remote control key when the touch input interface corresponds to the remote control keys.

The first region may include touch input regions of the at least one graphic object, which are divided by outlines, and at least one sub-region which corresponds to each graphic object and is included in each touch input region defined by an outline.

The at least one sub-region may be defined in a form depending on the type and size of the at least one graphic object. One sub-region may display one or more graphic objects. Here, a specific sub-region may be defined such that the specific sub-region and neighboring sub-regions do not overlap, and sub-regions may be separated by outlines or a boundary region. In addition, at least one sub-region may be defined in a form depending on arrangement of each graphic object. For example, when the touch input interface is configured in the form of a qwerty keyboard, the first region correspond to the area including all function keys of the qwerty keyboard and sub-regions of the first region respectively represent function keys of the qwerty keyboard.

Each sub-region may display a combination of at least one numeral, character, symbol and figure. For example, a first sub-region can display one alphabetical character (e.g. 'Q') and two Korean alphabetical characters (e.g. 'ㅃ' and 'ㅕ').

Furthermore, the touch input interface may include a display region displaying an input graphic object in addition to the first region displaying at least one graphic object.

The controller may recognize the first region of the touch input interface as a touch input region of each graphic object (S120).

Specifically, upon reception of touch input applied to a specific sub-region of the first region of the touch input interface, the controller can recognize the touch input as touch input applied to a graphic object displayed in the specific sub-region. When the specific sub-region includes a plurality of graphic objects, the controller can recognize the touch input as touch input applied to one of the plurality of graphic objects according to a predetermined order. Upon reception of direct touch or proximity touch applied to the first sub-region, the controller can recognize the received touch as touch input applied to a specific sub-region. When touch input is applied to the first and second sub-regions, the controller can recognize the applied touch input as invalid touch input or as valid touch input applied to a sub-region having a relatively large touched region.

The controller may sense a distance to a first object of the user through a sensing unit when the mobile terminal approaches the first object while the touch input interface is displayed (S130). The first object corresponds to at least one of the body and the face of the user.

The sensing unit may include at least one of a proximity sensor, an infrared sensor, an optical sensor, an image sensor, a heat sensor, an ultrasonic sensor and an electromagnetic sensor and may be provided to the inside of the touchscreen of the display unit (351 of FIG. 2), the upper portion of the touchscreen, the side of the case (301 of FIG. 2) or the lower portion of the case. The sensing unit may include a first sensing module formed in a first area of the terminal, which comes into contact with the user, and a second sensing module formed in a second area of the terminal, which does not come into contact with the user, according to state in which the user wears the terminal. Here, the first area refers to a region directly coming into contact with the user or indirectly coming into contact with the user through clothing and the second area refers to at least one side of the main body (301 of FIG. 2) of the mobile terminal.

The second sensing module can sense approach of the first and second objects within a predetermined distance and discriminate the first object from the second object on the basis of a sensed area. The first object corresponds to the body or face of the user and the second object corresponds to a user finger, a pen or a pointer.

The controller can discriminate a state in which the user wears the terminal from a state in which the user does not wear the terminal using information sensed by the sensing unit and control the distance between the terminal and the first object of the user to be sensed only when the user wears the terminal. That is, the controller can control the second sensing module to sense the distance between the terminal and the first object when the first sensing module senses wearing of the terminal. The controller can define that the state in which the user wears the terminal includes a case in which the mobile terminal is fixed to a portion of the body of the user using a band, a ring and the like, a case in which the mobile terminal is put on a portion of the body of the user to be held in position, a case in which the mobile terminal is fixed to clothing that the user wears.

The controller may not sense the distance to the user when the user approaches the terminal while the user does not wears the terminal, for example, when the user approaches the terminal put on a table or when the user approaches the terminal put in a pocket of the clothing of the user.

The controller may determine whether the distance to the first object of the user, sensed through the sensing unit, is included in a predetermined range (S140). The controller can sense the distance between the sensing unit and the first object of the user wearing the terminal. The first object of the user may correspond to a portion of the body of the user, which does not directly come into contact with the terminal, for example, the face or the body of the user.

The controller may set a reference distance range between the terminal and the first object using statistics regarding the distance between the terminal and the first object when touch input is applied to the display unit of the watch type mobile terminal using the second object and determine whether the distance to the first object, sensed through the sensing unit, is included in the reference distance range.

When the distance to the first object of the user wearing the terminal is included in the distance range (YES in S140), the controller may change the touch input region of each graphic object to a specific region discriminated from the first region and recognize the specific region as a touch input region for receiving touch input from the second object (S150).

At least parts of the specific region and the first region overlap. The specific region is obtained by changing the shape of the first region or rotating the first region in a clockwise or counter-clockwise direction within a specific angle range. That is, the specific region refers to a region obtained by correcting the range of the first region.

Specifically, the specific region includes at least one of a region obtained by reducing the first region, a region obtained by magnifying the first region, a region obtained by rotating the first region within a specific angle range, a region obtained by reducing each sub-region constituting the first region, a region obtained by magnifying each sub-region constituting the first region and a region obtained by rotating each sub-region constituting the first region within a specific angle range.

The controller can recognize the specific region obtained by rotating the first region within the specific angle range as the touch input region of each graphic object. Here, the controller can rotate the specific angle range in a clockwise or counter-clockwise direction according to a direction in which the user wears the mobile terminal. Specifically, when the user puts the terminal on the right wrist, the controller can recognize a specific region, obtained by rotating the first region a specific angle in a clockwise direction, as the touch input region of each graphic object. When the user puts the terminal on the left wrist, the controller can recognize a specific region, obtained by rotating the first region the specific angle in a counter-clockwise direction, as the touch input region of each graphic object.

The controller may set the specific angle range differently according to the distance to the first object and determine the specific region by rotating the first region by a wide angle according to the distance to the first object. For example, the controller can set the specific angle range to θ1 when the distance to the first object is in the range of d1 to d2 and to θ2 when the distance to the first object is in the range of d2 to d3.

The controller may determine at least one specific sub-region, obtained by rotating at least one sub-region constituting the first region by a specific angle, as a specific region. In addition, the controller may recognize some sub-regions constituting the first region as touch input regions of corresponding graphic objects and recognize specific sub-regions changed from other sub-regions constituting the first region as touch input regions of corresponding graphic objects, according to sizes of the sub-regions constituting the first region. That is, sub-regions constituting the first region can be recognized as touch input regions or corrected to specific sub-regions and recognized as touch input regions according to the sizes of the sub-regions constituting the first region.

Specifically, when the size of each sub-region constituting the first region is less than a reference value, the controller can recognize a specific sub-region, obtained by rotating each sub-region a specific angle, as a touch input region of a graphic object displayed in each sub-region of the first region.

On the contrary, when the size of each sub-region constituting the first region exceeds the reference value, the controller can recognize each sub-region of the first region as the touch input region of a graphic object displayed in each sub-region.

The controller may determine whether to correct a touch input region in consideration of the direction and distance of user's gaze sensed through the camera (321 of FIG. 3). That is, the controller can determine one of the first region and the specific region as the touch input region of each graphic object in consideration of the direction and distance of user's gaze. Specifically, the controller can recognize the first region as the touch input region of each graphic object when the direction of user's gaze, sensed through the camera, does not face the display unit (351 of FIG. 3) or when the distance of user's gaze is not included in a reference range. That is, the controller can correct the touch input region upon determining that the user will apply input to the display unit on the basis of the direction and distance of user's gaze. The controller can determine that the user will apply input to the display unit when the user gazes at the display unit and the distance of user's gaze is included in the reference range.

The controller may display a pop-up window through which the first region or the specific region is selected as the touch input region of each graphic object. The controller may determine one of the first region and the specific region as the touch input region of each graphic object according to input received through the pop-up window. In addition, the controller may notify the user of information about correction of the touch input region through the pop-up window such that the user can select correction of the touch input region.

The controller may determine whether to display the pop-up window according to the direction and distance of user's gaze sensed through the camera. Specifically, the controller may analyze the direction and distance of user's gaze, display the pop-up window upon determining that the user will apply input to the display unit and determine correction of the touch input region according to selection of the user, input through the pop-up window. Upon determining that the user will not apply input to the display unit, the controller may not display the pop-up window irrespective of whether the touch input region is corrected.

When the distance to the user wearing the terminal is not included in the predetermined range (NO in S140), the controller may keep recognizing the first region of the touch input interface as the touch input region of each graphic object (S120).

The controller may display the first region and recognize the specific region discriminated from the first region as the touch input region. The controller may display the specific region in such a manner that the specific region and at least part of the first region overlap and recognize the specific region as the touch input region. The controller may display the specific region in a transparent or translucent manner such that at least one sub-region constituting the first region can be discriminated from at least one specific sub-region constituting the specific region. The controller may simultaneously display the first region and the specific region only when the distance to the first object is included in the predetermined range and cancel display of the specific region when the distance to the first object exceeds the predetermined range.

The controller may correct the first region to a specific region and recognize the specific region as the touch input region of each graphic object. When the specific region is displayed on the display unit, the controller may magnify and display some sub-regions constituting the specific region according to a position of a user's finger, which is sensed through the sensing unit. The controller may restore the size of the corresponding sub-regions to their original size when the position of the finger, sensed through the sensing unit, is changed by a critical range or more.

Specifically, the controller can restore the size of the sub-regions to the original size when the user's finger is separated from the display unit by a predetermined reference distance or more. When the user's finger moves in the horizontal direction to another sub-region and enters within the predetermined reference distance, the controller may magnify and display the other sub-region according to the changed trajectory of the user's finger.

Accordingly, the controller can magnify some sub-regions or restore the sub-regions to the original size and display the sub-regions according to horizontal or vertical trajectory of the user's finger.

The controller may magnify some sub-regions and display the sub-regions in a transparent manner when the distance between the user's finger and the display unit becomes less than the predetermined reference distance. In this case, the user can view the first region including the sub-regions in the original size through the magnified transparent sub-regions. The controller may control transparency of the magnified sub-regions as the user's finger approaches the display unit and may display the magnified sub-regions in a translucent manner when the user's finger approaches within a distance in which proximity touch is recognized. Upon reception of touch input applied to a specific sub-region from among the translucent sub-regions, the controller may receive input applied to a graphic object displayed in the specific sub-region.

Figure 4:
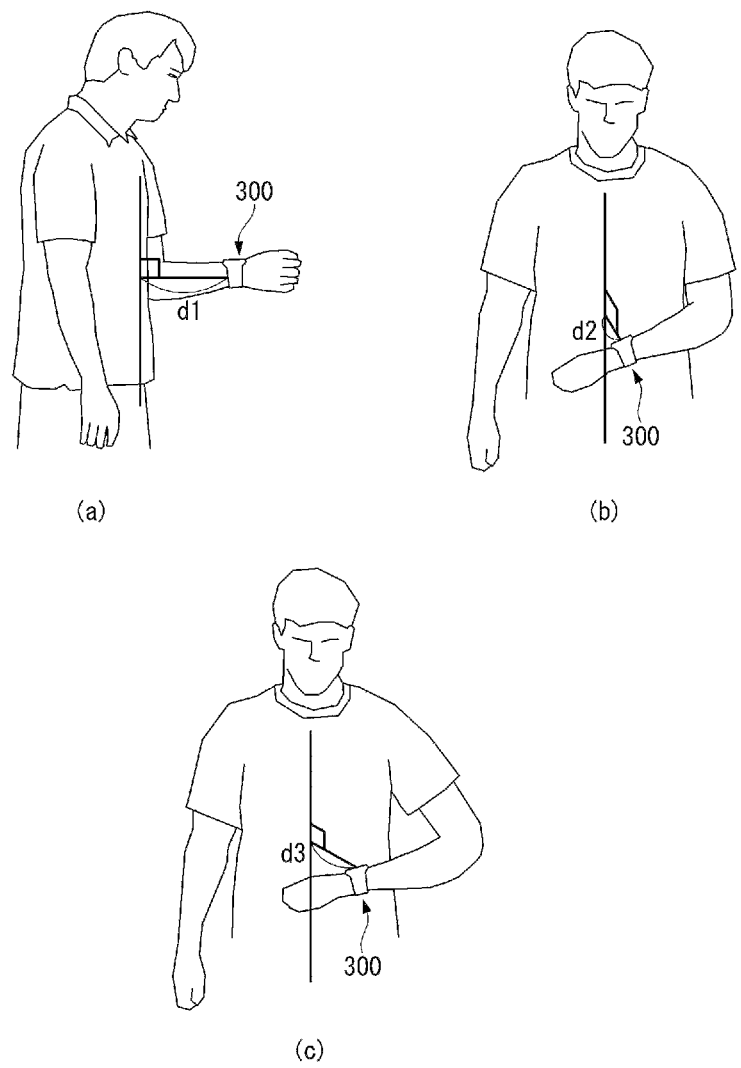
Figure 5:
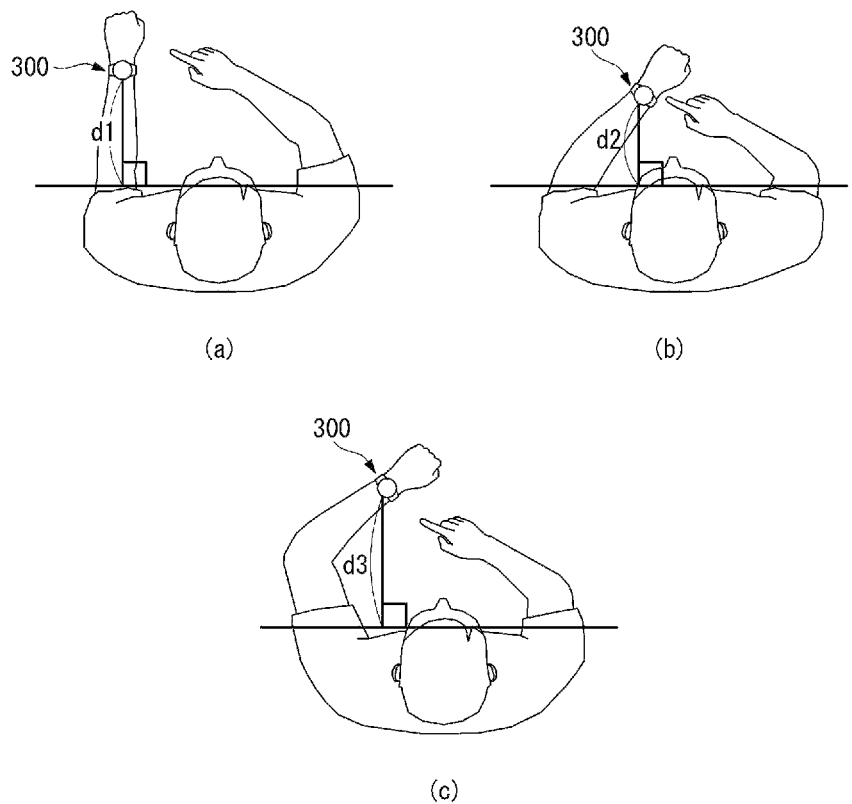

FIGS. 4 and 5 show states in which the user wears the mobile terminal according to the present invention.

Referring to FIGS. 4(a), 4(b), 5(a) and 5(b), when the user bends the arm on which the watch type mobile terminal 300 is put 90 degrees with the armpit in contact with the body and then rotates the arm toward the body, the controller can determine the perpendicular distances d1 and d2 between the watch type mobile terminal 300 and the surface of the body of the user as a distance to the user. Here, the distance to the user can be sensed in a range less than the average distance between the elbow and the wrist of the arm.

Referring to FIGS. 4(c) and 5(c), when the user bends the arm on which the watch type mobile terminal 300 is put with the armpit separated from the body and then rotates the arm toward the body, the controller can determine the perpendicular distance d3 between the watch type mobile terminal 300 and the surface of the body of the user as a distance to the user. Here, the distance to the user can be sensed in a range less than the average distance between the elbow and the wrist of the arm.

Upon sensing of wearing of the mobile terminal through the sensing unit, the controller may recognize a distance to a portion of the user body, which is closest to the mobile terminal, other than the portion of the body on which the mobile terminal is put, as the distance to the user. When the user brings the terminal close to their body in order to use the terminal while wearing the mobile terminal, the distance between the terminal and the body of the user or the distance between the terminal and the face of the body can be generally recognized as the distance to the user.

Figure 6:
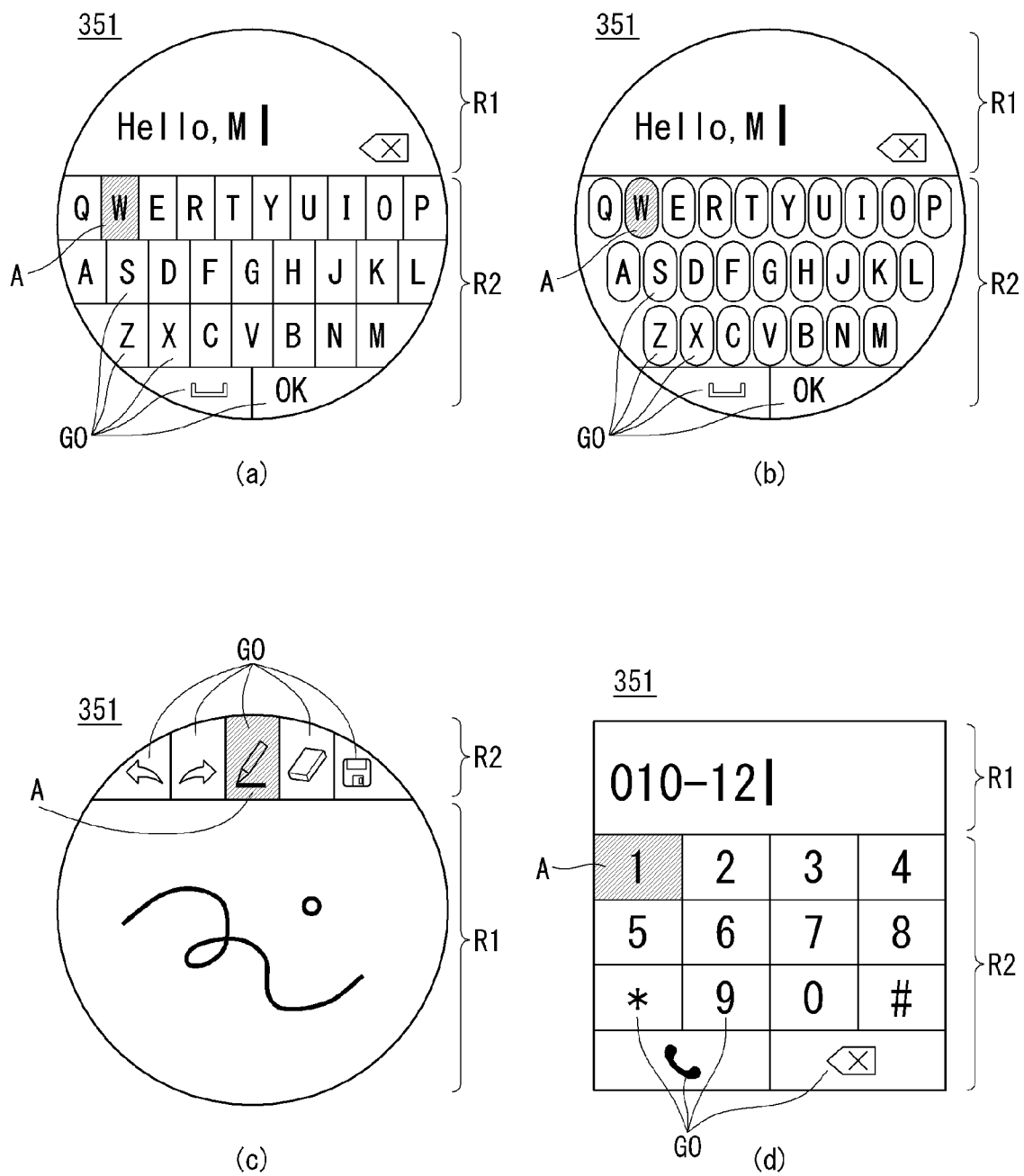

FIG. 6 illustrates various types of the touch input interface of the watch type mobile terminal according to the present invention.

Referring to FIG. 6, the controller of the watch type mobile terminal may display, on the display unit 351, various types of the touch input interface according to executed applications. The touch input interface may include a display region R1 in which an input graphic object is displayed and the first region R2 corresponding to an input region in the form of at least one of a qwerty keyboard, drawing panel menu, remote control keys and dial keys.

The first region R2 of the touch input interface may include touch input regions of one or more graphic objects GO, which are defined by outlines, and at least one sub-region which represents each graphic object and is included in each outlined touch input region. While only a specific sub-region is indicated by a reference symbol A in the figure, the at least one sub-region is indicated by the same symbol as the specific sub-region in the following description.

The at least one sub-region A may be defined in a shape depending on the type and size of at least one graphic object GO, and the at least one graphic object GP may include at least one of a numeral, character, symbol and figure. The specific sub-region A may be defined by the outline or a separation region without overlapping a neighboring sub-region. While some graphic objects and some sub-regions are indicated by reference symbols for clarity in the figure, corresponding graphic objects and sub-regions are indicated by the same reference symbols in the following description.

Referring to FIG. 6(a), the touch input interface may be configured in the form of a qwerty keyboard in which the sub-regions of the first region R2 are partitioned by outlines Each sub-region may be contiguous to other sub-regions and may display a graphic object GP including at least one of a numeral, character, symbol and figure. For example, alphabetical character 'W' can be displayed in the sub-region A.

The controller may display a plurality of input graphic objects 'Hello, M' in the display region R1 of the touch input interface. The controller may edit the input graphic objects upon reception of specific input applied to the display region R1 of the touch input interface.

Referring to FIG. 6(b), the touch input interface may be configured in the form of a qwerty keyboard in which the sub-regions of the first region R2 are partitioned by a separation region.

Each sub-region may be defined by an outline that does not overlap neighboring sub-regions and may display a graphic object GP including at least one of a numeral, a character, a symbol and a figure. For example, alphabetical character 'W' can be displayed in the sub-region A. The at least one sub-region may be defined in a form depending on the type, size and configuration of at least one graphic object.

The controller may display the plurality of input graphic objects 'Hello, M' in the display region R1 of the touch input interface. The controller may edit the input graphic objects upon reception of specific input applied to the display region R1 of the touch input interface.

Referring to FIG. 6(c), the touch input interface may be configured in the form of a drawing panel menu in which the sub-regions of the first region R2 are defined by one boundary line.

Each sub-region may have an outline at least part of which overlaps neighboring sub-regions and may display a graphic object GO including at least one of a numeral, character, symbol and figure. For example, a specific figure corresponding to a graphic object can be displayed in the sub-region A. The at least one sub-region may be defined in a form depending on the type, size and configuration of at least one graphic object. For example, when a graphic object displayed in a specific sub-region is large, the specific sub-region can be displayed larger than other sub-regions.

The controller may display an input geometrical figure in the display region R1 of the touch input interface. The controller may edit the input content upon reception of specific input applied to the display region R1 of the touch input interface.

Referring to FIG. 6(d), the touch input interface may be configured in the form of dial keys in which the sub-regions of the first region R2 are discriminated from neighboring sub-regions by one boundary line.

Each sub-region may have an outline at least part of which overlaps neighboring sub-regions and may display a graphic object GO including at least one of a numeral, symbol and figure. For example, graphic object '1' can be displayed in the sub-region A. At least one sub-region may be defined in a form depending on the type, size and configuration of at least one graphic object. For example, when a graphic object displayed in a specific sub-region is large, the specific sub-region can be displayed larger than other sub-regions.

The controller may display input phone numbers '010-12' in the display region R1 of the touch input interface. The controller may edit the input graphic object upon reception specific input applied to the display region R1 of the touch input interface.

FIGS. 7 and 8 are views for explaining a method for correcting touch input according to a direction in which the user wears the mobile terminal related to the present invention.

Referring to FIG. 7, the controller may recognize a specific region, obtained by rotating the first region a specific angle in a counter-clockwise direction, as a touch input region of each graphic object upon determining that the user puts the terminal on the left wrist.

Referring to FIG. 7(a), the controller can recognize a specific region, obtained by rotating the first region a specific angle in a counter-clockwise direction, as the touch input region of each graphic object upon determining that the user puts the terminal on the left wrist and a distance to the user wearing the terminal is included in a predetermined range.

Referring to FIGS. 7(b) and 7(c), the controller may predetermine a specific angle irrespective of the distance to the user and, when the distance to the user is included in the predetermined range, rotate the touch input region the predetermined specific angle in a counter-clockwise direction. Here, the specific angle may be set to 45 degrees.

The controller may recognize a specific sub-region B, obtained by rotating the sub-region A the specific angle in a counter-clockwise direction, as a touch input region. The controller may not display specific regions (indicated by dotted lines).

In addition, the controller may divide the range of the distance to the user into two or more ranges and set different specific angles respectively corresponding to the divided ranges.

Referring to FIG. 8, the controller may recognize a specific region, obtained by rotating the first region a specific angle in a clockwise direction, as the touch input region of each graphic object upon determining that the user puts the terminal on their right wrist.

Referring to FIG. 8(a), the controller may recognize a specific region, obtained by rotating the first region a specific angle in a counter-clockwise direction, as the touch input region of each graphic object upon determining that the user puts the terminal on their right wrist and the distance to the user wearing the terminal is included in the predetermined range.

Referring to FIGS. 8(b) and 8(c), the controller may predetermine a specific angle irrespective of the distance to the user and, when the distance to the user is included in the predetermined range, rotate the touch input region the predetermined specific angle in a clockwise direction. Here, the specific angle may be set to 45 degrees.

The controller may recognize a specific sub-region B, obtained by rotating the sub-region A the specific angle in a clockwise direction, as a touch input region. The controller may not display specific regions (indicated by dotted lines).

In addition, the controller may divide the range of the distance to the user into two or more ranges and set different specific angles respectively corresponding to the divided ranges.

Figure 9:
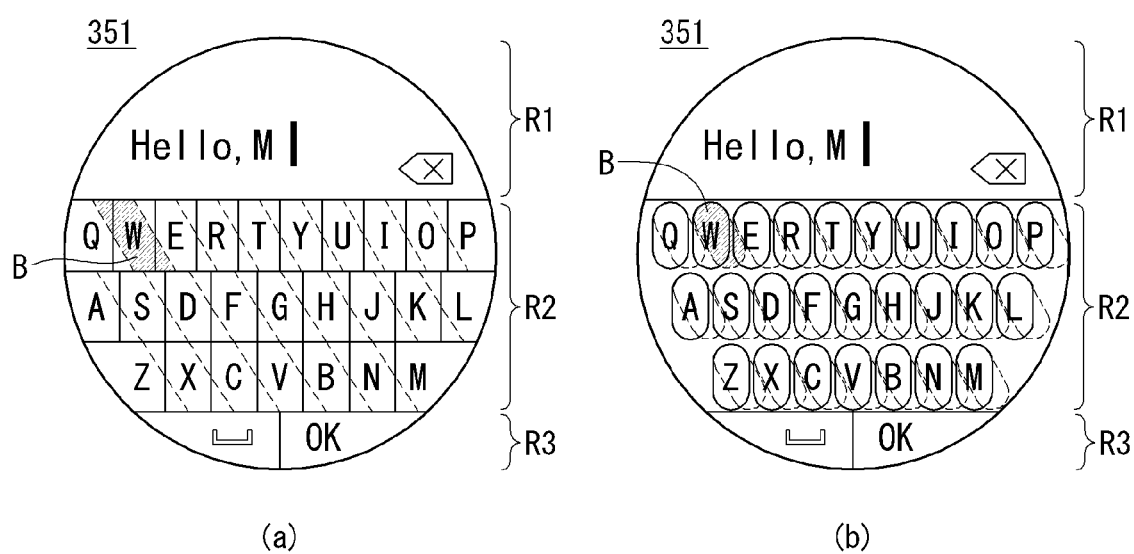

FIG. 9 is a view for explaining a method for correcting touch input according to the size of a sub-region of the mobile terminal related to the present invention.

Referring to FIG. 9, the controller may determine whether to correct a touch input region according to sizes of sub-regions constituting the first region. Here, the controller may determine the sub-region sizes per sub-region.

When the size of each sub-region (A of FIG. 6) is less than a reference value (each sub-region of the region R2), the controller may recognize a specific sub-region B, obtained by rotating each sub-region a specific angle, as the touch input region of each graphic object. The controller may recognize a slashed region B, obtained by correcting the touch input region of each graphic object, as the touch input region of each graphic object.

When the size of each sub-region exceeds the reference value (each sub-region of a region R3), the controller may recognize each sub-region of the region R3 as the touch input region of each graphic object without correcting the touch input region. That is, the controller does not correct touch input regions displaying graphic objects 'Enter' and 'OK' corresponding to sub-regions having sizes that exceed the reference value, recognizes the regions in which the graphic objects are displayed as touch input regions. In addition, the controller may correct touch input regions in which other graphic objects are displayed and recognize the corrected regions as touch input regions.

The controller may recognize only the touch input regions corresponding to R2 as regions according to the slashed region while display state of the regions R2 and R3 is maintained.

Figure 10:
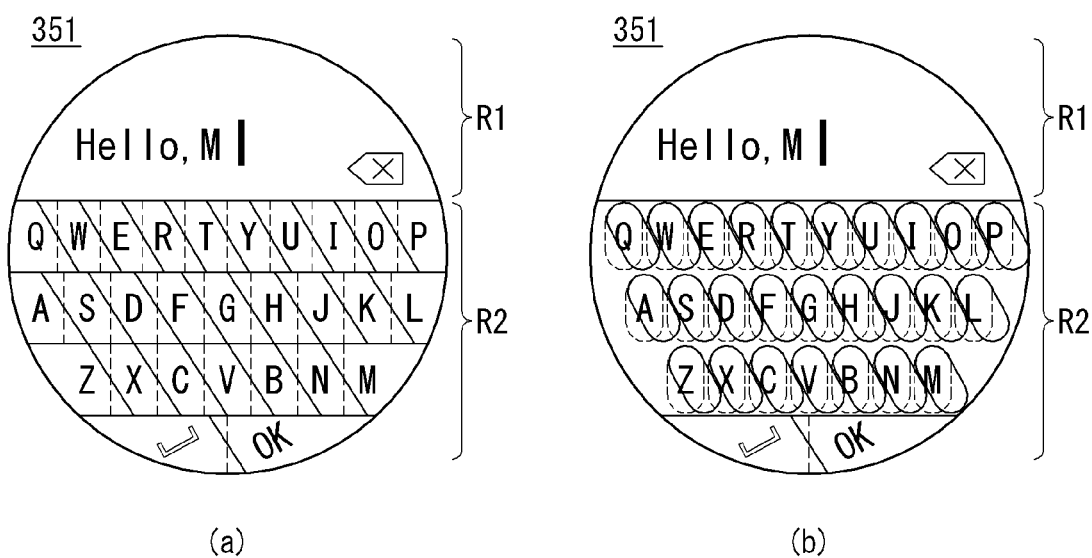

FIG. 10 is a view for explaining a method for displaying a corrected touch input region in the mobile terminal according to the present invention.

Referring to FIG. 10, the controller may display a specific region corresponding to a corrected touch input region by a solid line and display the first region corresponding to an initially displayed touch input region by a slashed line.

The controller may simultaneously display the first region and the second region on the touch input interface. Here, the controller may display a specific region in a transparent or translucent manner such that the first region can be checked. When the touch input region is corrected, the controller may display only the specific region corresponding to the corrected touch input region on the touch input interface, which is not shown in the figure.

Figure 11:
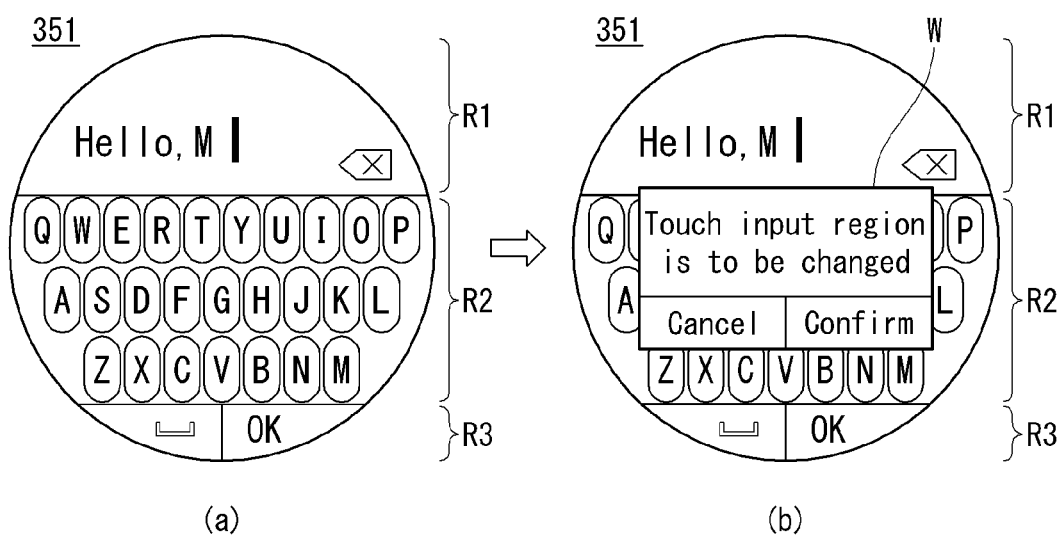

FIGS. 11 and 12 are views for explaining a method for displaying a pop-up window for guiding touch input region correction in the mobile terminal according to the present invention.

Referring to FIG. 11, the controller may display, on the display unit 351, a pop-up window W through which correction of a touch input region is selected when the distance to the user is included in the predetermined range.

The controller may display the pop-up window through which the first region or a specific region is selected and determine one of the first region and the specific region as the touch input region of each graphic object according to input received through the pop-up window.

Specifically, the controller can change the touch input region to a specific region and recognize the specific region upon selection of 'Confirm' through the pop-up window. The controller can maintain the touch input region as the first region and recognize the first region upon selection of 'Cancel' through the pop-up window.

Referring to FIG. 12, the controller may display the pop-up window W through which correction of the touch input region is selected according to the direction and distance of user's gaze, sensed through the camera.

The controller can display the pop-up window W when the direction of user's gaze faces the display unit and the distance of user's gaze is within a predetermined reference distance. The controller may determine whether to correct the touch input region using the direction and distance of user's gaze, sensed though the camera, as well as the distance to the user, sensed through the sensing unit.

The controller may change the touch input region to a specific region and recognize the specific region upon selection of 'Confirm' through the pop-up window. The controller can maintain the touch input region as the first region and recognize the first region upon selection of 'Cancel' through the pop-up window.

Figure 13:
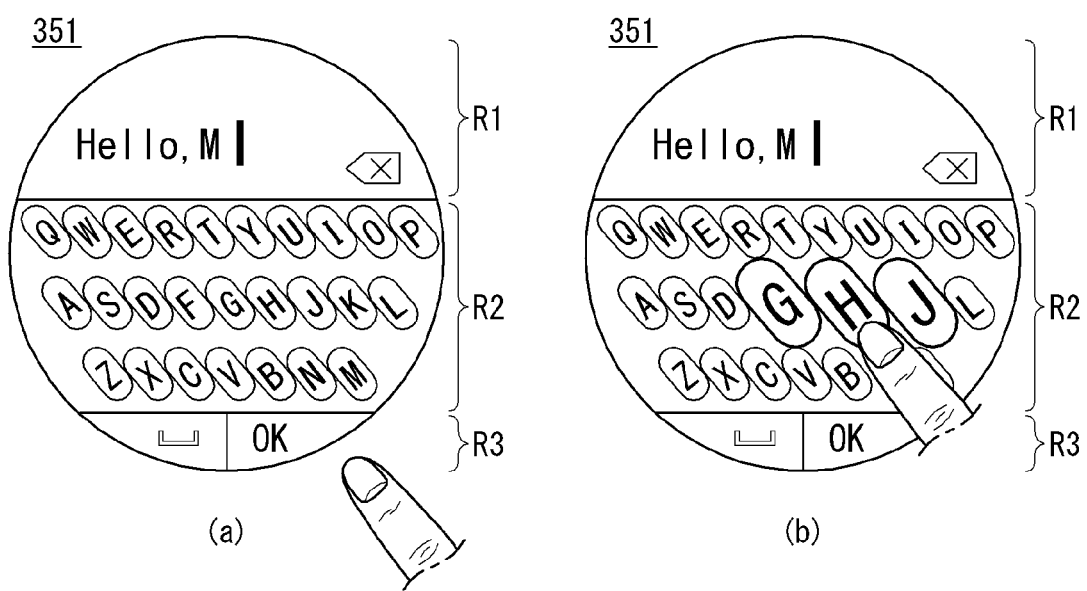
Figure 14:
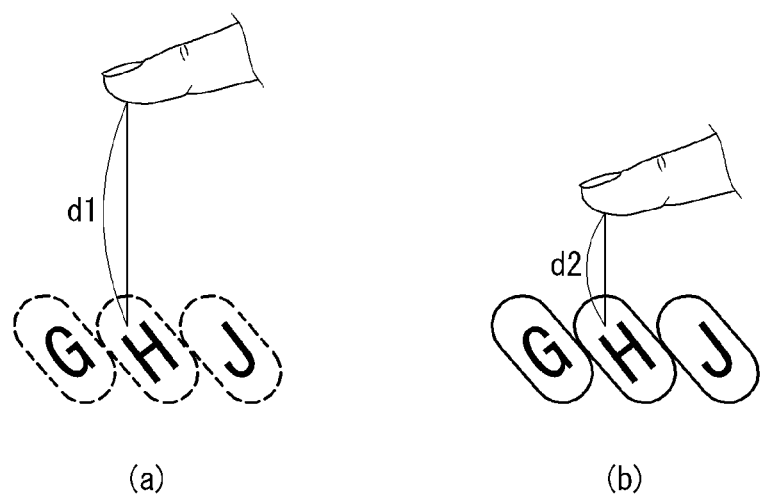
Figure 15:
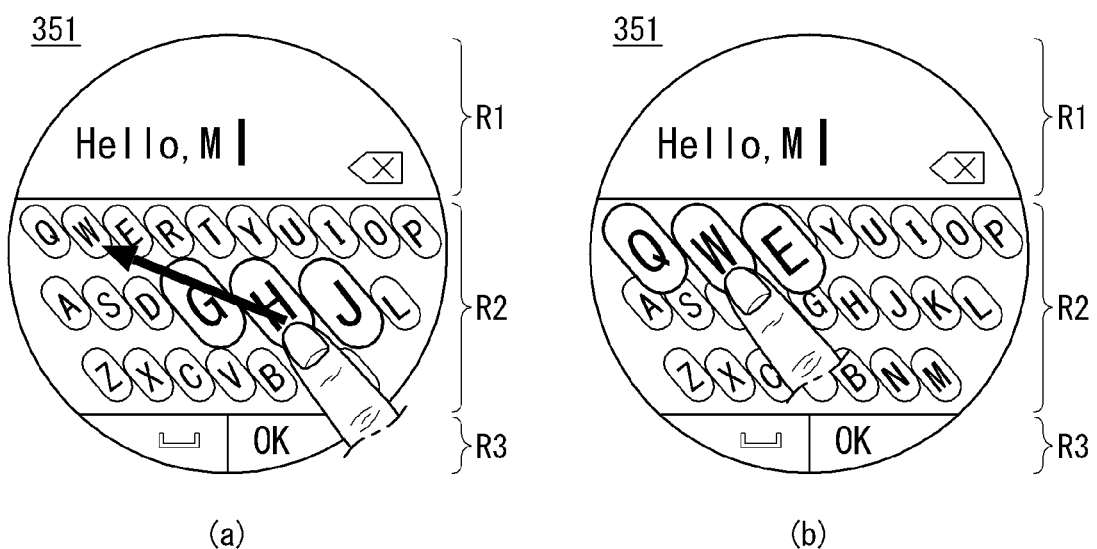

FIGS. 13, 14 and 15 are views for explaining a method for displaying a sub-region according to trajectory of a finger of the user in the mobile terminal according to the present invention.

Referring to FIG. 13, when the first region includes a plurality of sub-regions, the controller may magnify and display some of the plurality of sub-regions in consideration of the position of a finger of the user, sensed through the sensing unit. Here, some sub-regions may correspond to one sub-region, N sub-regions, sub-regions in one row or the like, which correspond to horizontal coordinates of the finger.

The position of the finger may be determined by the distance (referred to as 'vertical coordinates' hereinafter) between the surface of the display unit and the finger and the coordinates (referred to as 'horizontal coordinates' hereinafter) of the finger projected to the display unit.

The controller may determine some sub-regions to be magnified using the horizontal coordinates of the finger, determine whether to magnify the determined sub-regions using the vertical coordinates and control transparency of the sub-regions For example, when the distance to the first object, sensed through the sensing unit, is within the predetermined distance range, the controller can correct the touch input region to a specific region and display the specific region on the display unit. When the horizontal coordinates of the finger correspond to a specific sub-region in which graphic object 'H' is displayed, the controller may magnify and display specific sub-regions on the left and right of the specific sub-region.

Consequently, the controller can magnify and display three sub-regions respectively representing graphic objects 'H', 'G' and 'J'.

Referring to FIG. 14, the controller may determine sub-regions to be magnified on the basis of the horizontal coordinates and vertical coordinates of the finger and determine whether to magnify the determined sub-regions and transparency thereof.

As described above, the controller can determine sub-regions to be magnified using the horizontal coordinates of the finger. The controller can magnify and display the determined sub-regions when the vertical coordinates of the finger are less than a first reference value d1 and can restore the sub-regions to their original size when the vertical coordinates of the finger exceed the first reference value d1.

In addition, the controller can magnify the sub-regions and display the magnified sub-regions in a transparent manner when the vertical coordinates of the finger are less than the first reference value and gradually control transparency of the displayed sub-regions as the vertical coordinates of the finger gradually decrease within the first reference value d1. When the vertical coordinates of the finger are less than a second reference value d2, the controller may display the sub-regions in a translucent manner and receive touch input applied to one of the sub-regions.

Referring to FIG. 15, when the horizontal coordinates of the finger changes by a critical range or more, the controller may determine sub-regions corresponding to the changed horizontal coordinates of the finger. Consequently, when the finger moves only in the horizontal direction, the controller can change magnified sub-regions according to trajectory of the finger and magnify and display the changed sub-regions.

When the vertical coordinates and horizontal coordinates of the finger are simultaneously changed, the controller may restore the displayed magnified sub-regions to their original size and determine sub-regions corresponding to the changed horizontal coordinates if the vertical coordinates exceed the first reference value. Then, the controller may magnify and display the determined sub-regions when the vertical coordinates of the finger become less than the first reference value. As described above, the controller may control the transparency of the displayed magnified sub-regions as the vertical coordinates of the finger gradually decrease within the first reference value.

For example, the controller can magnify and display sub-regions respectively representing graphic objects 'G', 'H' and 'J' when the horizontal coordinates of the finger correspond to the sub-region indicating graphic object 'H' and magnify and display the sub-region representing graphic object 'W' and sub-regions on the left and right thereof when the horizontal coordinates of the finger change and correspond to the sub-region representing graphic object 'W'. Here, a method of determining some sub-regions and the number of sub-regions may be determined according to a predetermined rule.

While the watch type mobile terminal including the circular display unit has been described as an embodiment, the present invention is applicable to a mobile terminal including a polygonal display unit.

Figure 16:
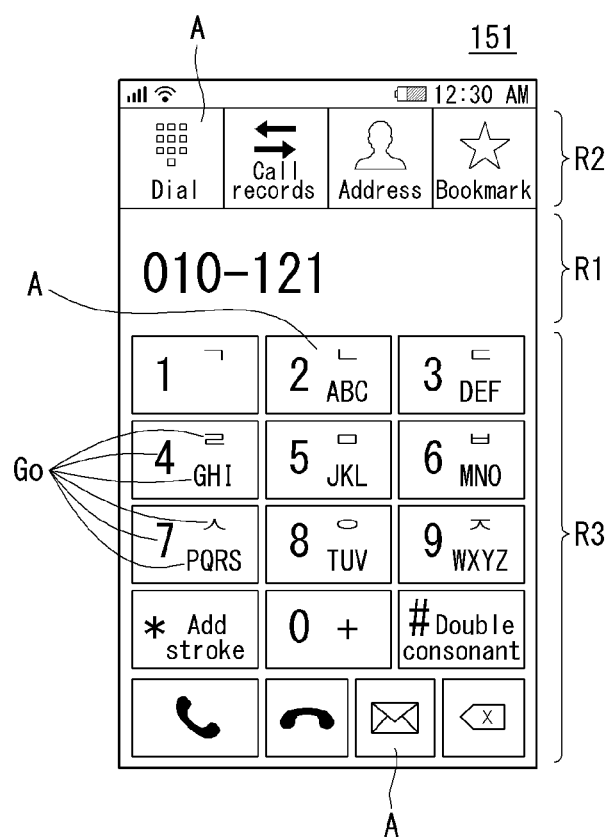
Figure 17:
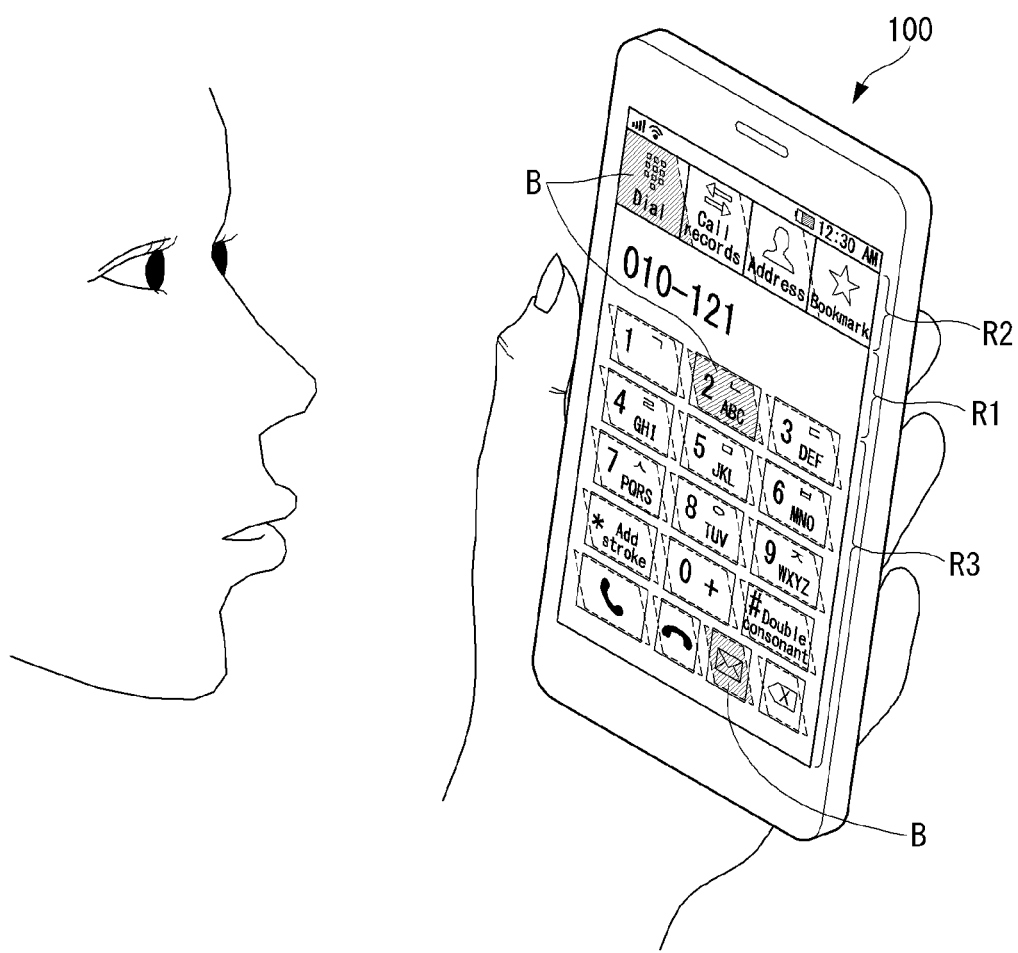

FIGS. 16 and 17 illustrate a touch input interface of a hand-held type mobile terminal and a state in which the mobile terminal is used according to the present invention.

Referring to FIG. 16, a controller of the hand-held type mobile terminal may display the touch input interface on the display unit 151 according to a currently executed application. The touch input interface may be implemented in various forms according to executed applications.

The touch input interface may include the display region R1 in which an input graphic object is displayed and the first region R2 and R3 corresponding to an input region in the form of a menu and dial keys.

The first region R2 and R3 of the touch input interface includes a touch input region of at least one graphic object GO, which is defined by an outline and includes at least one sub-region displaying each graphic object. While only a specific sub-region from among the at least one sub-region is indicated by a reference character A, the at least one sub-region is represented by the same reference character in the following description.

The at least one sub-region A may be defined in a form depending on the type and size of at least one graphic object GP and the at least one graphic object GO may include at least one of a numeral, character, symbol and figure. The specific sub-region A may not overlap neighboring sub-regions, may be defined by outline and may be discriminated from neighboring sub-regions by a separation region. While some graphic objects and some sub-regions are represented by reference characters in the figures, corresponding graphics and sub-regions are represented by the same reference characters in the following description for clarity.

The touch input interface may be configured in the form of menu keys and dial keys such that sub-regions constituting the first region R2 and R3 can be defined by outlines.

Each sub-region may be contiguous to other sub-regions and display a graphic object GO including at least one of a numeral, character, symbol and figure. For example, a text message icon can be displayed in the sub-region A.

The controller may display a plurality of input graphic objects '0101-12' in the display region R1 of the touch input interface. The controller may edit the input graphic objects upon reception of specific input applied to the display region R1 of the touch input interface.

Referring to FIG. 17, when the terminal approaches within a predetermined distance from the first object, the controller (180 of FIG. 1) may change the touch input region of each graphic object to a specific region discriminated from the first region and recognize the specific region as a touch input region through which touch input is received from the second object.

Specifically, when the user brings the mobile terminal close to the face and thus the distance between the terminal and the user face becomes less than a predetermined distance, the controller can change touch input regions from the first region (solid-line region) to specific regions (dotted-line regions) and recognize the specific regions.

The controller may recognize a specific region, obtained by rotating each sub-region (A of FIG. 16) constituting the first region (solid-line region) a predetermined angle corresponding to the direction of a user's finger corresponding to the second object, as a touch input region. Here, the controller may rotate each sub-region in a predetermined angle range or change the size and form of each sub-region while rotating each sub-region to determine a specific sub-region B. In addition, the controller may represent points constituting each sub-region as (x, y) coordinates and multiply the (x, y) coordinates by a specific matrix to determine the specific sub-region. The specific sub-region refers to a region at least part of which overlaps each sub-region constituting the first region and which is obtained by correcting the size, direction, form and the like of each sub-region constituting the first region. The aforementioned methods for determining the specific sub-region are exemplary and may be modified in various manners. FIG. 17 illustrates an embodiment in which each sub-region is rotated in a predetermined angle and thus the size and shape thereof are changed to set the specific sub-region B.

The controller may control the display unit to recognize the touch input region of each graphic object as a specific region (or a specific sub-region) while only the first region (solid-line region) is displayed. In addition, the controller may control the display unit to display all specific regions (dotted-line regions) as well as the first region (solid-line region) or to cancel display of the first region (solid-line region) and to display only the specific regions (dotted-line regions).

Figure 18:
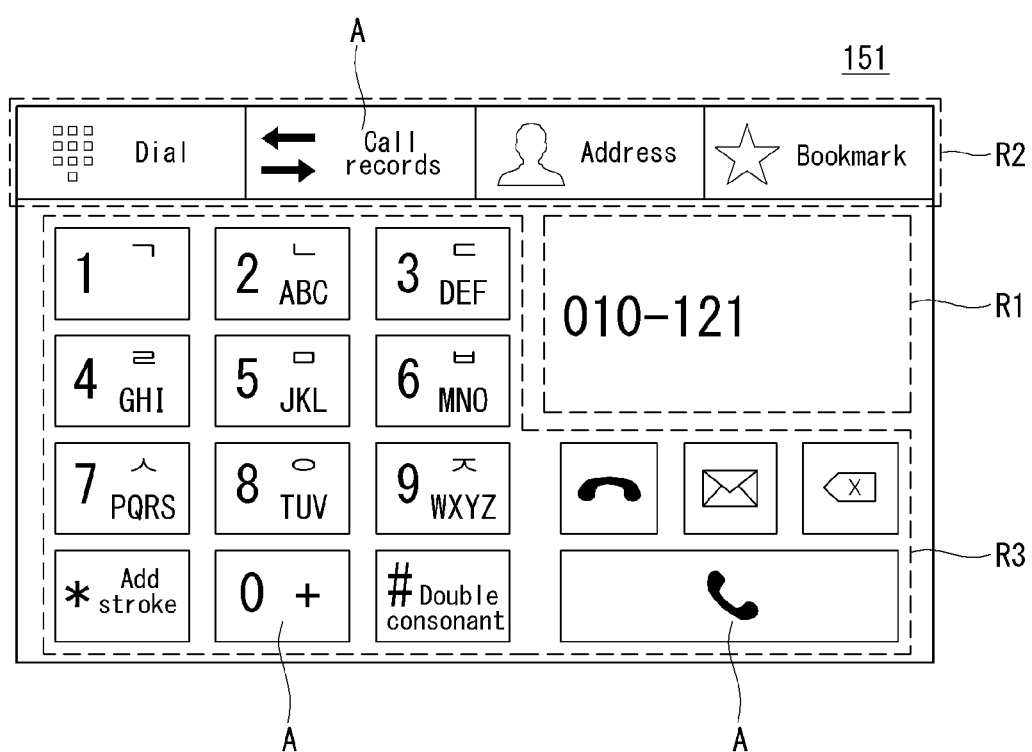
Figure 19:
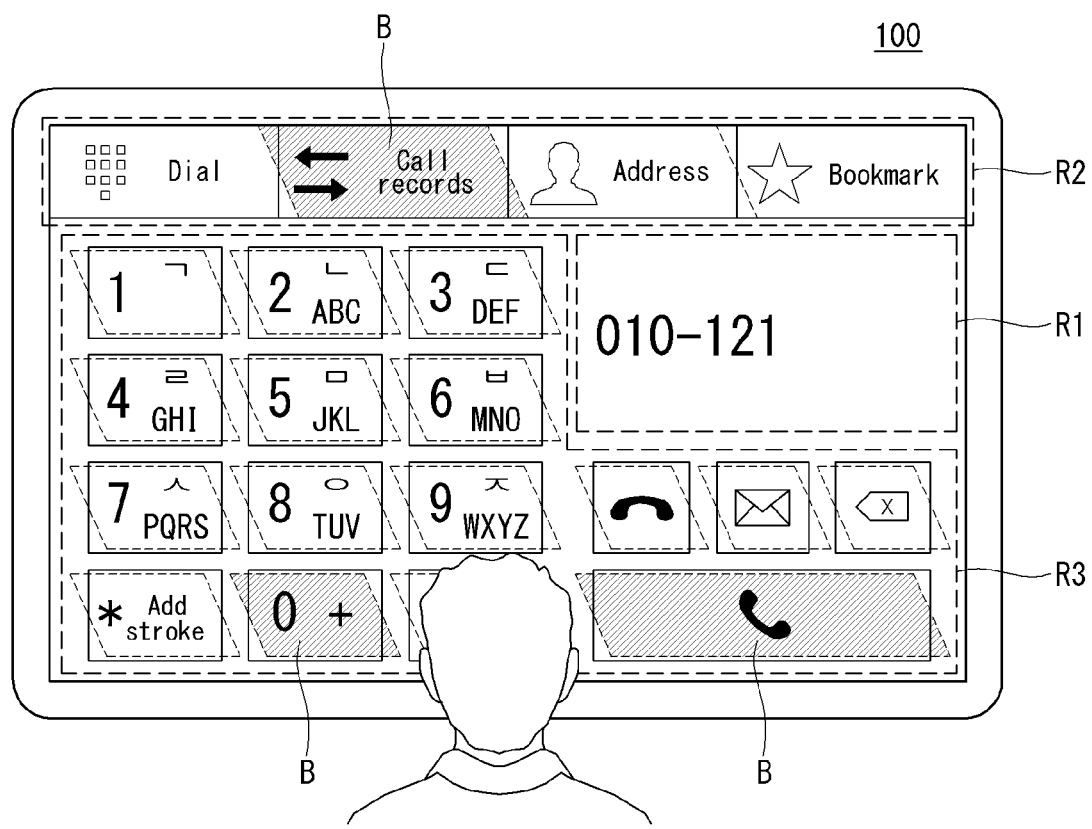

FIGS. 18 and 19 illustrate a touch input interface of a wall display type terminal and a state in which the wall display type terminal is used according to the present invention.

Referring to FIG. 18, a controller of the wall display type terminal may display the touch input interface in a form depending on a currently executed application, on the display unit 151.

The touch input interface may include a display area R1 and a first area R2 and R3 corresponding to an input area in the form of a menu and dial keys. The controller may partition the touch input interface according to the size and form of the display unit. FIG. 18 illustrates an embodiment in which the touch input interface is displayed on a relatively large display unit and positions of graphic objects included in the touch input interface are rearranged and defined differently.

The first region R2 and R3 of the touch input interface may include a touch input region of at least one graphic object GO, which is defined by an outline and includes at least one sub-region A including each graphic object. The at least one sub-region A may be defined in a form depending on the type and size of at least one graphic object GP and the at least one graphic object GO may include at least one of a numeral, character, symbol and figure. The specific sub-region A may not overlap neighboring sub-regions, may be defined by the outlet and may be discriminated from neighboring sub-regions by a separation region. While some graphic objects and some sub-regions are represented by reference characters in the figures, corresponding graphics and sub-regions are represented by the same reference characters in the following description for clarity.

The touch input interface may be configured in the form of menu keys and dial keys such that sub-regions constituting the first region R2 and R3 can be defined by outlines.

Each sub-region may be contiguous to other sub-regions and display a graphic object GO including at least one of a numeral, character, symbol and figure. For example, a figure of arrows, character, number, a symbol, a phone icon or the like can be displayed in the sub-region A.

The controller may display a plurality of input graphic objects '0101-12' in the display region R1 of the touch input interface. The controller may edit the input graphic objects upon reception of specific input applied to the display region R1 of the touch input interface.

Referring to FIG. 19, when approach of the first object to the terminal 100 within a predetermined distance is sensed through the sensing unit, the controller (180 of FIG. 1) may change the touch input region of each graphic object to a specific region discriminated from the first region and recognize the specific region as a touch input region through which touch input is received from the second object.

The present invention may include not only a case in which the terminal approaches the first object such as the face or body of the user but also a case in which the first object approaches the terminal. In the case of the wall display type mobile terminal 100, the user generally approaches the mobile terminal to use the mobile terminal. Even when the user approaches the mobile terminal within a predetermine distance, the controller of the mobile terminal can correct the touch input region of each graphic object to a specific region and recognize the specific region.

Specifically, when approach of the face of body of the user to the terminal within the predetermined distance is sensed through the sensing unit, the controller can change touch input regions from the first region (solid-line region) to specific regions (dotted-line regions) and recognize the specific regions.

The controller may recognize a specific region B, obtained by rotating each sub-region (A of FIG. 18) constituting the first region (solid-line region) a predetermined angle corresponding to the direction of a user's finger corresponding to the second object, as a touch input region. Here, the controller may rotate each sub-region in a predetermined angle range or change the size and form of each sub-region while rotating each sub-region to determine a specific sub-region B. In addition, the controller may represent points constituting each sub-region as (x, y) coordinates and multiply the (x, y) coordinates by a specific matrix to determine the specific sub-region. The specific sub-region refers to a region at least part of which overlaps each sub-region constituting the first region and which is obtained by correcting the size, direction, form and the like of each sub-region constituting the first region. The aforementioned methods for determining the specific sub-region are exemplary and may be modified in various manners. FIG. 19 illustrates an embodiment in which each sub-region is rotated in a predetermined angle and thus the size and shape thereof are changed to set the specific sub-region B. While only specific sub-regions B from among a plurality of sub-regions constituting a specific regions (dotted-line regions) (other than dotted-line regions defining the areas R1, R2 and R3) are indicated by the reference character for convenience of description, the specific sub-regions B are not discriminated from other sub-regions.

The controller may control the display unit to recognize the touch input region of each graphic object as a specific region (or a specific sub-region) while only the first region (solid-line region) is displayed. In addition, the controller may control the display unit to display all specific regions (dotted-line regions) as well as the first region (solid-line region) or to cancel display of the first region (solid-line region) and to display only the specific regions (dotted-line regions).

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
a sensing unit;
a display unit; and
a controller configured to:
   display, on the display unit, a touch input interface including at least one graphic object and a first region defined to correspond each graphic object;
   recognize the defined first region as a touch input region of the each graphic object;
   change the touch input region of the each graphic object to a specific region discriminated from the defined first region upon sensing approach of the mobile terminal within a predetermined distance from a first object through the sensing unit; and
   recognize the changed specific region as the touch input region for receiving a touch input from a second object while a distance between the mobile terminal and the first object keeps within the predetermined distance,
   wherein the first object corresponds to at least one of a body and a face of a user, and the second object corresponds to at least one of a finger of the user, a touch pen, a stylus pen and a pointer.

2. The mobile terminal of claim 1, wherein the specific region is a region at least part of which overlaps the first region, the specific region including at least one of a region obtained by decreasing a size of the first region, a region obtained by increasing the size of the first region, a region obtained by rotating the first region within a specific angle range, a region obtained by reducing a size of each sub-region constituting the first region, a region obtained by increasing the size of the each sub-region and a region obtained by rotating the each sub-region within the specific angle range.

3. The mobile terminal of claim 1, wherein the touch input region of the at least one graphic object is defined by an outline, and the first region includes at least one sub-region including the each graphic object within the outline, and
   wherein the at least one sub-region is defined in a form depending on a type and a size of the at least one graphic object, the at least one sub-region being defined not to overlap a neighboring sub-region.

4. The mobile terminal of claim 3, wherein the controller is further configured to recognize a region, obtained by rotating each sub-region a specific angle, as the touch input region of the each graphic object when the each sub-region has a size less than a reference value and to recognize the each sub-region as the touch input region of the each graphic object when the each sub-region has a size over the reference value.

5. The mobile terminal of claim 1, wherein the touch input interface is formed of at least one shape of a qwerty keyboard, a drawing board menu, remote control keys and dial keys.

6. The mobile terminal of claim 1, wherein the controller is further configured to:
   detect a direction in which the user wears the mobile terminal when the mobile terminal comes into contact with a portion of the body of the user; and
   determine a region, obtained by rotating the first region clockwise or counter clockwise according to the detected direction, as the specific region.

7. The mobile terminal of claim 1, wherein the mobile terminal includes at least one of a smart watch or wearable healthcare equipment.

8. The mobile terminal of claim 1, further comprising:
a camera; and
wherein the controller is further configured to detect a direction and a distance of the user's gaze through the camera, and to determine one of the first region and the specific region as the touch input region of the each graphic object according to the detected direction and distance.

9. The mobile terminal of claim 1, wherein the at least one graphic object includes at least one of a numeral, a character, a symbol and a figure.

10. The mobile terminal of claim 1, wherein the controller is further configured to display a pop-up window to select the touch input region of the each graphic object, and to determine one of the first region and the specific region as the touch input region of the each graphic object according to an input received through the pop-up window.

11. The mobile terminal of claim 10, further comprising:
a camera; and
wherein the controller is further configured to detect a direction and a distance of the user's gaze through the camera, and to display the pop-up window according to the detected direction and distance.

12. The mobile terminal of claim 1, wherein the controller is further configured to display the specific region such that the specific region and at least part of the first region overlap, the specific region being displayed transparently or translucently.

13. The mobile terminal of claim 12, wherein the controller is further configured to magnify and display some of at least one sub-region constituting the specific region corresponding to a position of the user's finger, sensed through the sensing unit.

14. The mobile terminal of claim 13, wherein the controller is further configured to change the some sub-regions to other sub-regions corresponding to a trajectory of the finger, sensed through the sensing unit.

15. The mobile terminal of claim 13, wherein the controller is further configured to restore the some sub-regions when the position of the finger, sensed through the sensing unit, is changed more than a critical range.

16. The mobile terminal of claim 13, wherein the controller is further configured to adjust a transparency of the magnified sub-regions according to a distance between the finger and the display unit and to display the magnified sub-regions with the adjusted transparency.

17. The mobile terminal of claim 1, wherein the sensing unit includes at least one of a proximity sensor, an infrared sensor, an optical sensor, an image sensor, a heat sensor and an electromagnetic sensor.

18. The mobile terminal of claim 1, wherein the sensing unit includes a first sensing module formed in a first area of the mobile terminal and a second sensing module formed in a second area of the terminal, the first area coming into contact with a body of the user, the second area being not in contact with the body of the user, when the user wears the mobile terminal, and
wherein the controller is further configured to control the second sensing module to sense a distance between the first object and the mobile terminal when the first sensing module senses wearing of the mobile terminal.

19. A method for controlling a mobile terminal, the method comprising:
displaying, on a display unit, a touch input interface including at least one graphic object and a first region defined to correspond each graphic object;
recognizing the defined first region as a touch input region of the each graphic object;
changing the touch input region of the each graphic object to a specific region discriminated from the defined first region upon sensing approach of the mobile terminal within a predetermined distance from a first object; and
recognizing the changed specific region as the touch input region for receiving touch input from a second object while a distance between the mobile terminal and the first object keeps within the predetermined distance,
wherein the first object corresponds to at least one of a body and a face of a user, and the second object corresponds to at least one of a finger of the user, a touch pen, a stylus pen and a pointer.

\* \* \* \* \*